(12) United States Patent
Cerqua et al.

(10) Patent No.: US 6,585,278 B1
(45) Date of Patent: Jul. 1, 2003

(54) RECUMBENT BICYCLE WITH CONCENTRIC MID-DRIVE AND PIVOT

(75) Inventors: Timothy P. Cerqua, Saratoga Springs, NY (US); Kim L. Sherman, Rochester, NY (US); Michael A. Wilson, Atlanta, GA (US); Craig S. Smith, Ionia, NY (US)

(73) Assignee: Joule Cycles, Inc., Saratoga Springs, NY (US)

( * ) Notice: Subject to any disclaimer, the term of this patent is extended or adjusted under 35 U.S.C. 154(b) by 0 days.

(21) Appl. No.: 10/058,885

(22) Filed: Jan. 28, 2002

Related U.S. Application Data (60) Provisional application No. 60/265,033, filed on Jan. 30, 2001.

(51) Int. Cl.[7] .................................................. B62K 3/02
(52) U.S. Cl. ...................... 280/287; 280/288.1; 280/284
(58) Field of Search ............................... 280/287, 288.1, 280/283, 284; 297/195.1, 196, 452.1, 452.39

(56) References Cited

U.S. PATENT DOCUMENTS

| | | | |
|---|---|---|---|
| D100,203 S | 6/1936 | Clements | |
| 2,482,472 A | * 9/1949 | Fried | 280/261 |
| D217,843 S | 6/1970 | Barris | 90/8 |
| 3,603,609 A | 9/1971 | Hott | 280/62 |
| 3,952,822 A | 4/1976 | Uddem et al. | 180/21 |
| 4,283,070 A | 8/1981 | Forrestall et al. | 280/274 |
| 4,333,664 A | 6/1982 | Turner et al. | 280/261 |
| 4,659,098 A | 4/1987 | Jacobson | 280/261 |
| D301,130 S | 5/1989 | Brummer | D12/111 |
| 5,007,675 A | 4/1991 | Musto et al. | 297/195 |
| 5,395,155 A | 3/1995 | Yach | 297/215.14 |
| D369,574 S | 5/1996 | Clarke | D12/111 |
| 5,513,895 A | 5/1996 | Olson et al. | 297/215.214 |
| 5,544,906 A | 8/1996 | Clapper | 280/288.1 |
| 5,620,196 A | * 4/1997 | Belik | 280/281.1 |
| 5,887,882 A | 3/1999 | Atchison | 280/288.1 |
| 5,915,710 A | 6/1999 | Miller | 280/252 |
| 6,189,908 B1 | * 2/2001 | Lu | 280/284 |

FOREIGN PATENT DOCUMENTS

| | | | |
|---|---|---|---|
| GB | 2 136 744 A | 9/1984 | |
| WO | WO 200115965 A2 | * 3/2001 | B62M/00/00 |

OTHER PUBLICATIONS

Encycleopedia 96, The International buyers guide to alternatives in cycling, 1995, Open Road, Ltd., first published in Great Britain, Sep. 95 by Open Road Ltd, pp. 6–38.

* cited by examiner

*Primary Examiner*—Kevin Hurley
(74) *Attorney, Agent, or Firm*—Eugene Stephens & Associates; Steven R. Scott (57) ABSTRACT

A recumbent bicycle with (i) a cantilevered bicycle seat and (ii) a coaxial pivot and mid-drive sprocket around which the bicycle can be folded so as to form a more compact configuration. The folding of the bicycle is facilitated by the splaying of support arms for the coaxial pivot and mid-drive sprocket, which splaying allows the rear portion of the bicycle to be folded into a position lying between the splayed support arms.

27 Claims, 8 Drawing Sheets

RECUMBENT BICYCLE WITH CONCENTRIC MID-DRIVE AND PIVOT

This application claims the benefit of U.S. Provisional Application No. 60/265,033, filed on Jan. 30, 2001, which provisional application is incorporated by reference herein.

TECHNICAL FIELD

Our invention relates to the field of recumbent bicycles.

BACKGROUND OF THE INVENTION

An ever-increasing segment of the cycling public, particularly in the United States, rides and enjoys recumbent bicycles due to their comfort and performance. The basic configuration for a recumbent bicycle places the pedals ahead of, rather than below, the cyclist. This configuration allows the use of a more comfortable seat with seat back, which is typically placed lower to the ground than on ordinary bicycles. However, it also leads to problems that are distinctive to the field of recumbent bicycles.

One of the most important of these problems is shock absorption. As the recumbent cyclist is in a seated position with legs forward, he (or she) cannot absorb the extreme jolts and shocks associated with riding over rough surfaces or traversing potholes by utilizing his legs as shock absorbers. The bicycle and its frame must handle all shock absorption. This has led many manufacturers to utilize a bifurcated frame with a pivot placed in a structural member between the front wheel and the rear wheel. This pivot serves (in combination with a shock absorber of some type) to help absorb the shocks of the ride.

Unfortunately, the presence of a bifurcated frame has led to a problem for which no adequate solution has been found. This problem is formally referred to in the art as "pedaling induced suspension activation", and more informally referred to as "pogoing". It occurs when the cyclist pushes a pedal forward, putting stress on the upper part of the chain linkage between the pedal sprocket (which is ahead of the rider) or an intermediate mid-drive sprocket and the rear wheel sprocket. In effect, it causes this section of chain to temporarily shorten, which, in turn, causes the pivot to move upward and the bicycle frame to become temporarily shorter. As the pedals move into a more neutral position before the beginning of the next drive stroke by the rider's other foot, the pivot sags downward and the frame lengthens. This situation can rapidly develop into a steady, undesirable, up-and-down oscillation of the rider and frame—"pogoing".

Another important problem involves provision of adequate means for seat positioning. Positioning of the seat vis-à-vis the pedals becomes a more critical issue on a recumbent bicycle. The recumbent cyclist does not have the option of standing to pedal and thereby minimizing the importance of seat positioning. Further, he cannot adjust his distance to the pedals by sliding slightly forward or backward on the seat, as is possible for the user of a standard bicycle. Finally, the leverage relied upon by the recumbent cyclist is gained by working against the seat back of the recumbent bicycle seat. It is, therefore, absolutely necessary that the recumbent bicycle seat be not only comfortable, but also precisely and minutely adjustable for the comfort and mechanical advantage of the user. At the same time, the seat must be able to maintain its position, once established, against the constant and repeated force exerted by the rider as he pushes back against the seat on each pedal stroke.

No adequate solution to this problem has been achieved to date in the art of recumbent bicycles. Some manufacturers utilize seats with anchoring members that fit into rigid track notches. Such seats do not slide, but they lack the minute adjustability sought by discerning riders. Other manufacturers have utilized seats that are freely adjustable by sliding on a seat track. The distance between such seats and the pedals of the recumbent bicycle can be adjusted with precision. However, such seats are generally maintained in position by a clamp attached to the track. This clamp is, in turn, tightened and held in position by tightening a screw threaded bolt or other member. Screw threaded elements of this type are difficult to tighten to the degree necessary to hold the bicycle seat in position. Most have shown an inevitable tendency to begin moving over a period of time under the stresses created by pedaling the recumbent bicycle. In addition, such clamps are not easily and freely adjustable, but require the use of tools to loosen, adjust, and re-tighten.

SUMMARY OF THE INVENTION

Our invention solves the problems outlined above; significantly improves recumbent bicycle performance, comfort, and ease of use; and involves or creates numerous other subsidiary improvements and inventions of significance in the field of recumbent bicycles. It is hinged on our finding that the problems described above are interrelated and can both be solved simultaneously by (i) the use of a cantilevered bicycle seat in conjunction with (ii) a coaxial bicycle pivot and mid-drive sprocket. The first solution also led to the creation of a bicycle seat that was stable, was easily adjustable without tools, and could be adjusted with the type of precision demanded by the field. The second solution, in turn, led to the creation of a recumbent bicycle that was foldable. This innovation is extremely desirable for the recumbent cyclist as it leads to a bicycle that can be folded to occupy a smaller space. This not only eases storage problems; it creates a recumbent bicycle that can be placed easily in an automobile trunk or other vehicle storage area for transport to settings where the user wishes to ride his bicycle. Thus, it also greatly increases bicycle portability. These and other innovations unique to our design will become apparent upon review of the accompanying drawings and the more detailed description that follows.

DESCRIPTION OF THE INVENTION

Figure 1:
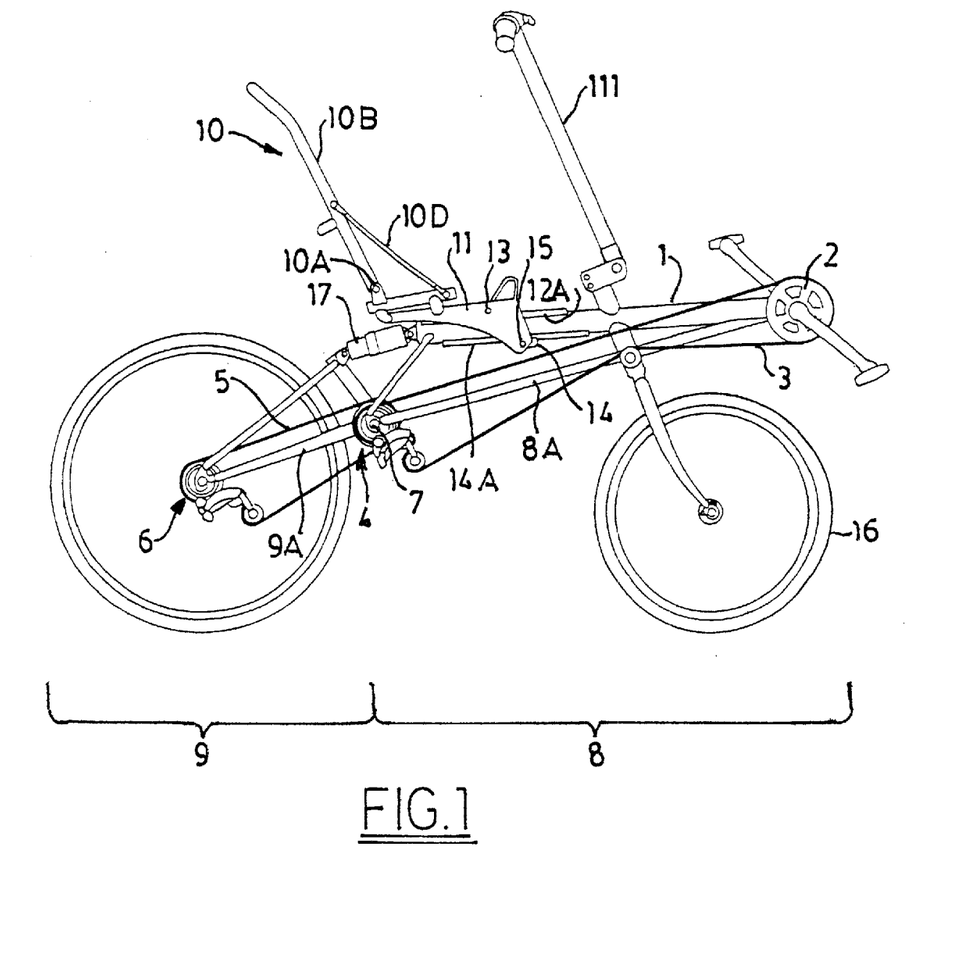
FIG. 1 provides a side view of a preferred embodiment of our recumbent bicycle.
Figure 2:
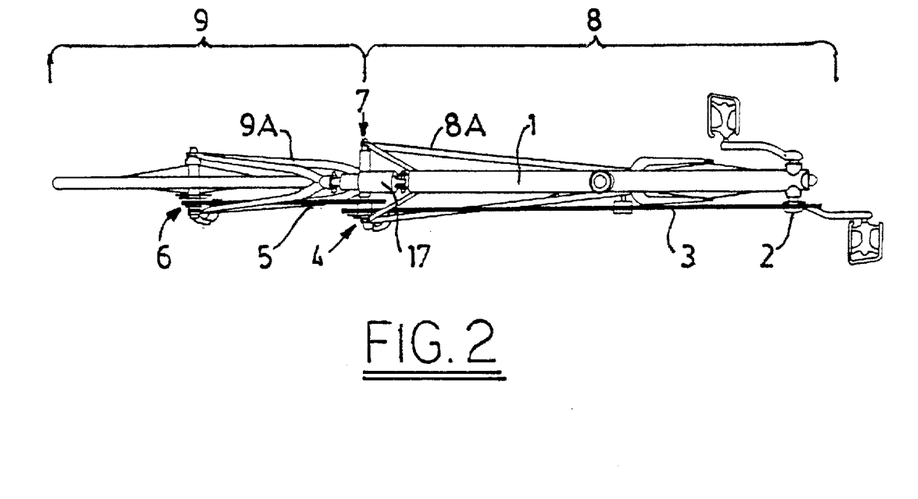
FIG. 2 provides a view from above of the preferred embodiment illustrated in FIG. 1 with its seat and handlebars removed.

The general features of the preferred embodiment are illustrated in FIG. 1 and FIG. 2. Our recumbent bicycle is provided with an upper structural member 1 with pedal sprocket 2 at its forward extremity. Pedal sprocket 2 interfaces with a forward chain 3 linked to mid-drive sprockets (denoted generally by arrow 4). Mid-drive sprockets 4 are linked via rear chain 5 to rear wheel sprockets (denoted generally by arrow 6). These elements provide the essential drive train for our recumbent bicycle.

The distance between the pedal sprocket 2 and the rear wheel sprockets 6 is extended in recumbent bicycles. This has led some manufacturers to position mid-drive sprocket (s) intermediate pedal sprocket 2 and rear wheel sprockets 6. However, our decision to make the mid-drive sprockets 4 and the pivot (denoted by arrow 7) coaxial is almost without precedent in this field. It has, either alone or in conjunction with the other design innovations described, below, led to other advantageous developments. First, it serves to completely eliminate the problem of pedaling induced suspension activation. Second, in conjunction with the other unique features described below, it allows the forward portion (indicated generally by bracket 8) and rear portion (indicated generally by bracket 9) of the recumbent bicycle we have developed to fold together for compactness around central pivot 7.

The first advantage derived from the use of a concentric mid-drive/pivot system arises from the fact that the distance between the mid-drive sprockets 4 and the rear wheel sprockets 6, as well as between the mid-drive sprockets 4 and the pedal sprocket 2, is fixed. In the first case, this distance is maintained by the rigid structure of rear portion 9 and interconnected lower members 9A thereof. In the second case, this distance is maintained by the rigid structure of forward portion 8 and interconnected connective members 8A. In neither case can stress placed on the upper chain link connecting the sprockets in question serve to pull these sprockets closer together and thereby initiate pogoing.

The second advantage also relies on a concentric mid-drive/pivot system. Without such a system, any significant degree of folding (i.e.—movement around the pivot 7 beyond the small amount that is necessary for shock absorption) would create an unacceptable amount of slack in the lubricated drive chain(s) used. Such slack could become entangled in other parts; could cause the drive chain to slip from the sprockets; and would, in other respects, be a source of problems, inconvenience, and mess. Even with a concentric mid-drive/pivot system, however, further innovation is necessary to produce a folding recumbent bicycle. Our innovations in this area principally relate to the manner in which the lower support members of the front portion 8 and the rear portion 9 are constructed. The front portion 8 features lower connective members 8A that are spread to the outside and linked to central pivot 7 outside of the link between lower members 9A. Both of these features are necessary. The spread or splaying of lower connective members 8A creates a substantial gap into which rear portion 9 can be folded. In addition, lower members 9A must be linked inside of lower connective members 8A in order to keep them from binding against these members as the front portion 8 and rear portion 9 are folded together.

Figure 3A:
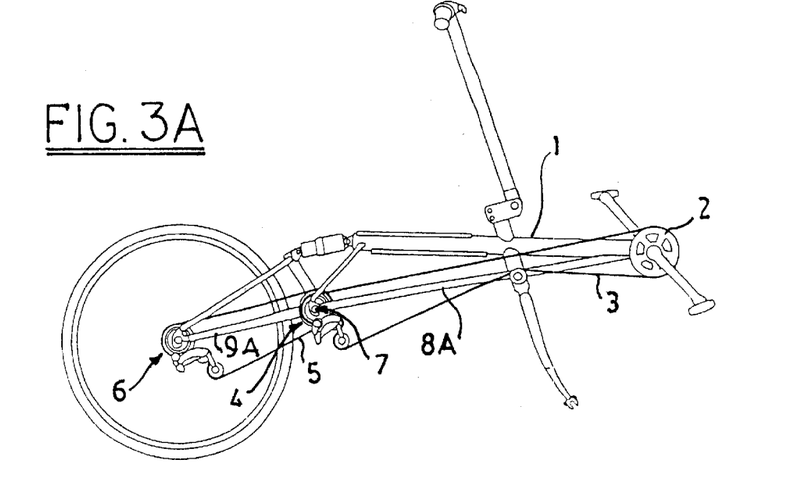
FIG. 3A provides a side view of the preferred embodiment with its seat and forward wheel removed.
Figure 3B:
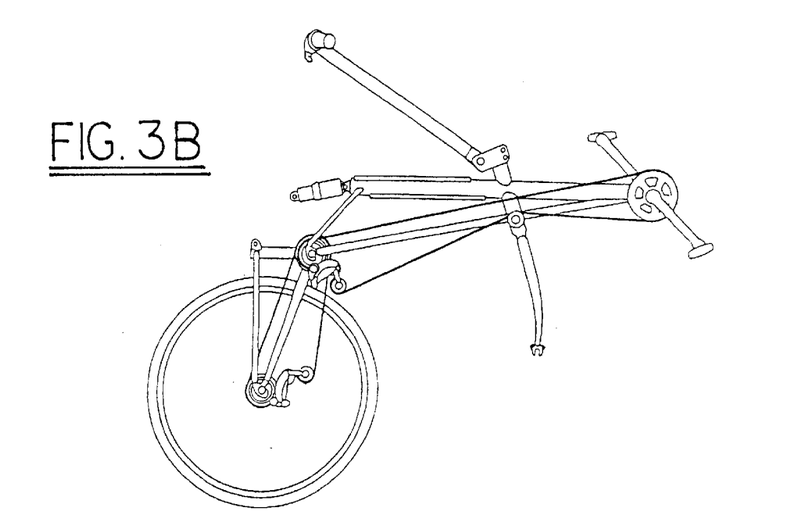
FIG. 3B provides a side view of the preferred embodiment in the process of being folded with its handlebars reversed and its shock absorber detached.
Figure 3C:
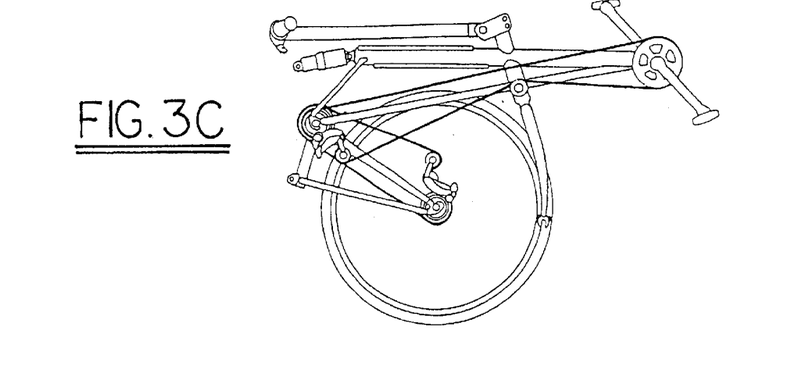
FIG. 3C provides a side view of the preferred embodiment of our recumbent bicycle after folding.

These features allow the recumbent bicycle of our invention to be folded following, in general, the sequence illustrated in FIGS. 3A through 3C. In FIG. 3A, the bicycle seat 10 has been removed. (This can be easily and simply accomplished by loosening and removing lower bolt 15.) The front wheel 16 has also been removed utilizing a standard quick release mechanism. In FIG. 3B, the handlebar 111 has been turned around (allowing it to be folded downward adjacent to upper structural member 1, as illustrated in sequence in FIGS. 3A through 3C). Further, the quick release connecting shock absorber 17 to rear portion 9 has been utilized to disconnect these two elements, allowing rear portion 9 to be swung forward around pivot 7. In FIG. 3C, the operation is complete, with rear portion 9 folded into forward portion 8. Seat 10 can be folded via seat pivots 10A. Thus, the folded recumbent bicycle along with its removed forward wheel 16 and removed and folded seat 10 can be placed together into a very small space for the convenience of the user, maker, or seller for storage, transportation, or shipping.

Figure 4:
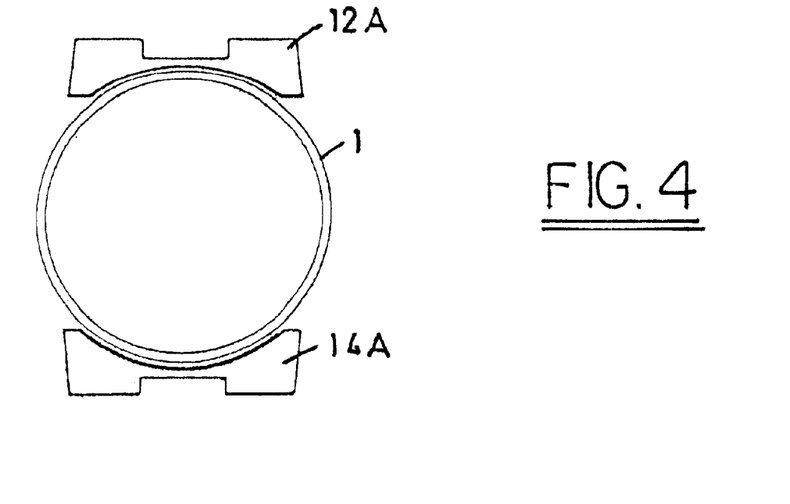
FIG. 4 provides a partial cross-sectional view of the upper structural member of the preferred embodiment and further shows the rails provided thereon for the mounting of the base for the recumbent bicycle's seat.
Figure 5:
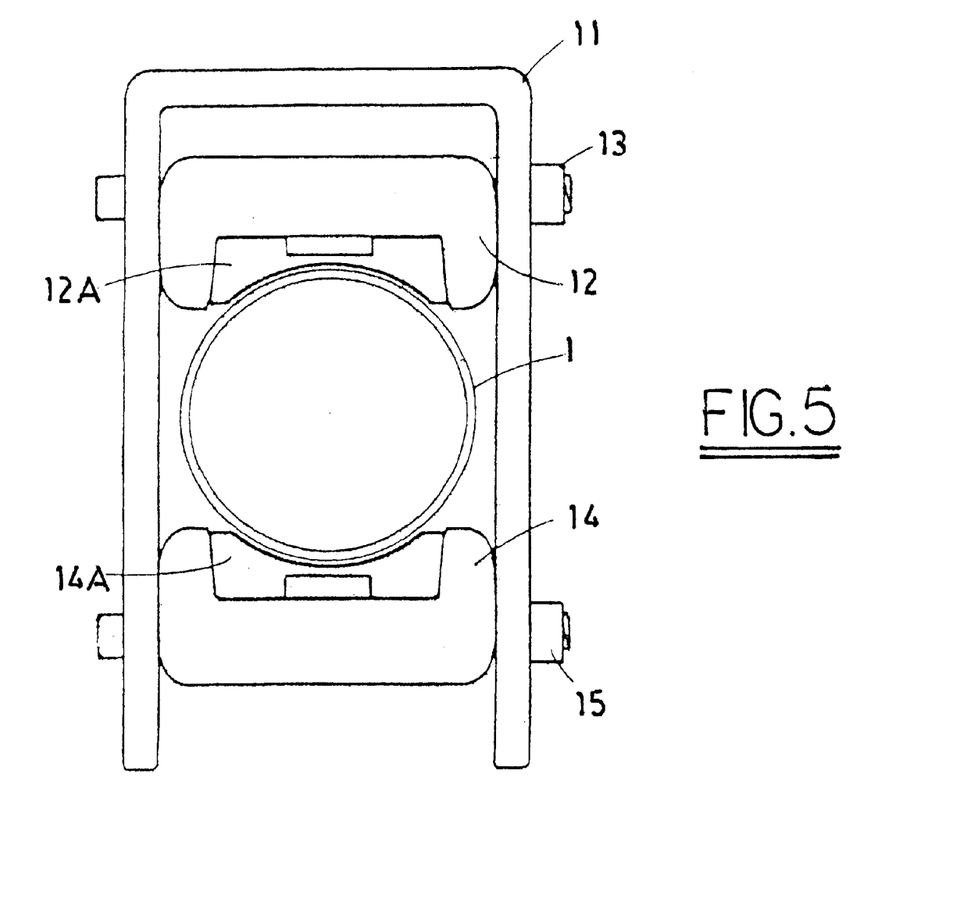
FIG. 5 provides a partial cross-sectional view of the upper structural member of the preferred embodiment with the base mounting member of the recumbent bicycle's seat mounted thereon.
Figure 6:
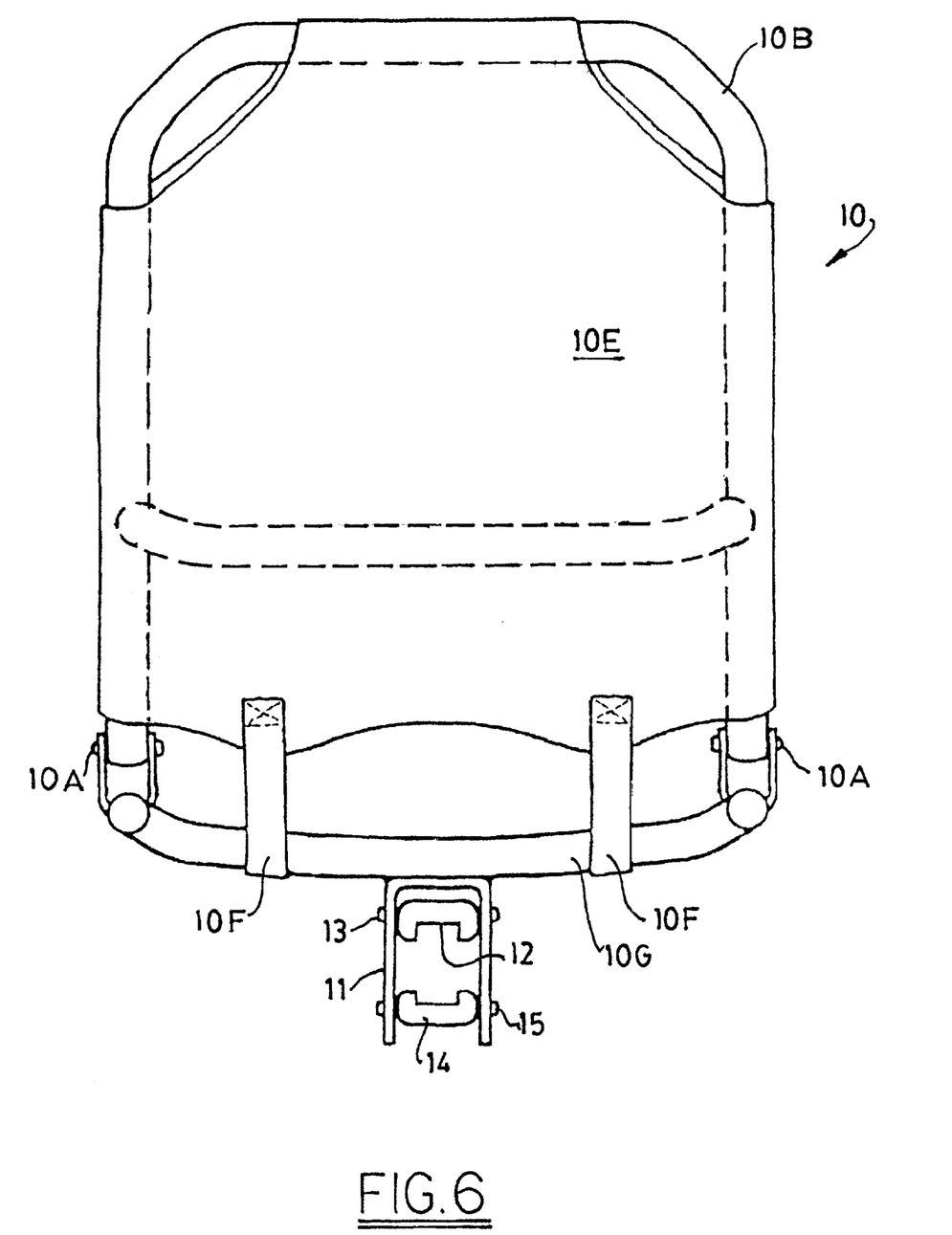
FIG. 6 provides a back view of the preferred embodiment of a seat for our recumbent bicycle, including its base mounting member.

As shown most clearly in FIGS. 4, 5, and 6, the seat 10 of our recumbent bicycle is attached via base mounting member 11. Base mounting member 11 is provided with a semi-deformable nylon upper lock block 12. This is secured to base mounting member 11 via upper bolt 13. It is also provided with a semi-deformable nylon lower lock block 14, which is secured to base mounting member 11 by lower bolt 15. As will be noted upon review of FIG. 1 and FIG. 7, lower lock block 14 is connected to base mounting member 11 ahead of upper lock block 12. With the user positioned against seat back 10B, his weight will be behind both upper lock block 12 and lower lock block 14. This cantilevered arrangement turns upper lock block 12 into a weight-bearing fulcrum, pushing it down hard against upper rail 12A. It likewise forces lower lock block 14, which is at the end of the lever arm formed by base mounting member 11, strongly upward against lower rail 14A. This forms a strong frictional grip between the vertical facing surfaces of each lock block and its respective rail. (Likewise, since a pedal being pushed by the rider results in a force applied to seat back 10B at a point above the level of the fulcrum formed, the push itself acts to torque seat 10 downward and further increase the frictional forces that prevent seat 10 from sliding.)

The cross-sectional tapered shape of the lock blocks and rails described also allows the formation of strong frictional grips between the horizontal facing surfaces of each lock block and its respective rail. Upper lock block 12 and lower lock block 14 are each formed with a "U"-shaped interior cross section with each arm of the "U" being approximately vertical and the horizontal facing surface of the "U" being approximately horizontal. Upper rail 12A and lower rail 14A both have a slightly tapered wedge shape with narrow ends terminating at a vertical facing surface. (These vertical facing surfaces have approximately the same width as the horizontal facing surfaces of the upper lock block 12 and lower lock block 14.) When nylon upper lock block 12 and nylon lower lock block 14 are forced against upper rail 12A and lower rail 14A, these parts wedge together and the semi-rigid materials forming the arms of upper lock block 12 and lower lock block 14 are forced to deform outward slightly. This wedging as well as the inward bias of the arms of these "U"-shaped members help to establish a strong frictional grip between the horizontal facing surfaces of these lock blocks and the horizontal facing surfaces of their respective rails.

Figure 7:
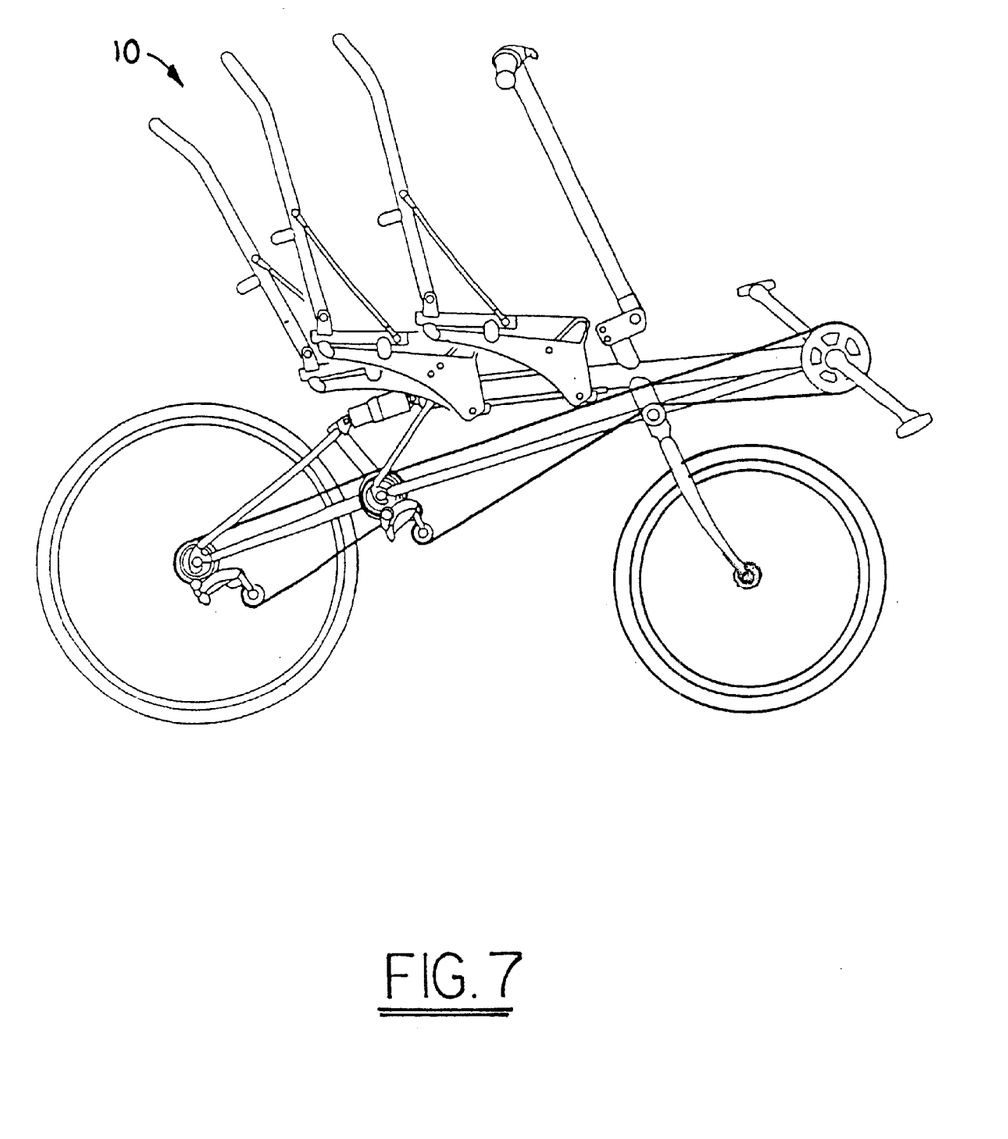
FIG. 7 provides a side view of the preferred embodiment illustrating the means by which its seat is moved and adjusted horizontally.

Lifting seat 10 disengages base mounting member 11 from upper rail 12A and lower rail 14A. This allows it to be freely moved and readjusted as illustrated in FIG. 7. Moving from right to left in this drawing figure, the seat 10 may be seen as being lifted (and disengaged) from a forward position and then moved back and settled in a rear position. Alternatively, moving from left to right, this drawing figure serves to show the seat 10 being lifted (and disengaged) from a rear position and moved to a forward position prior to being dropped and re-engaged. From either, standpoint, the adjustable and versatile nature of the recumbent bicycle seat of our invention is manifest.

Figure 8:
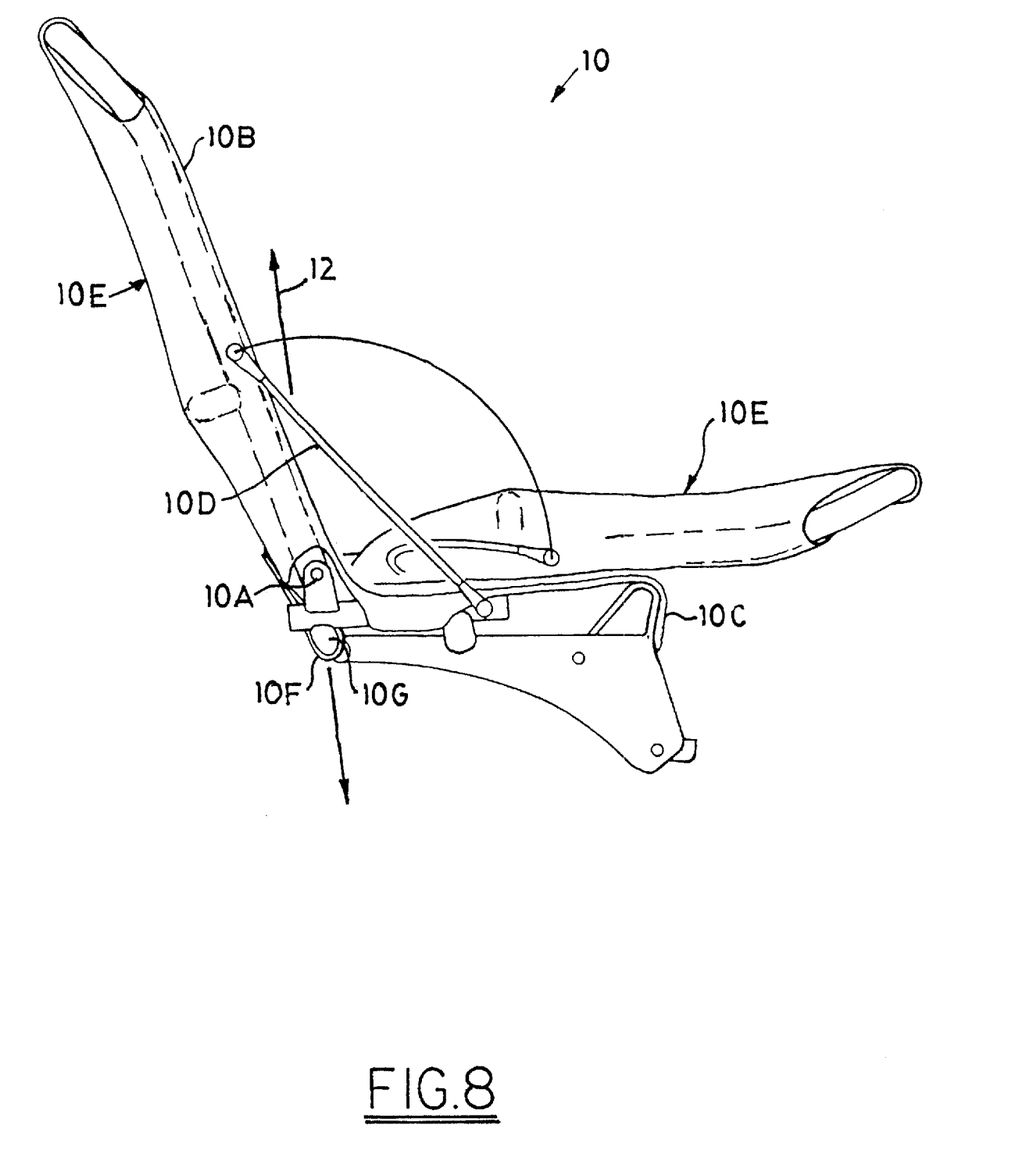
FIG. 8 provides a side view of the seat in its opened and closed positions.
Figure 9:
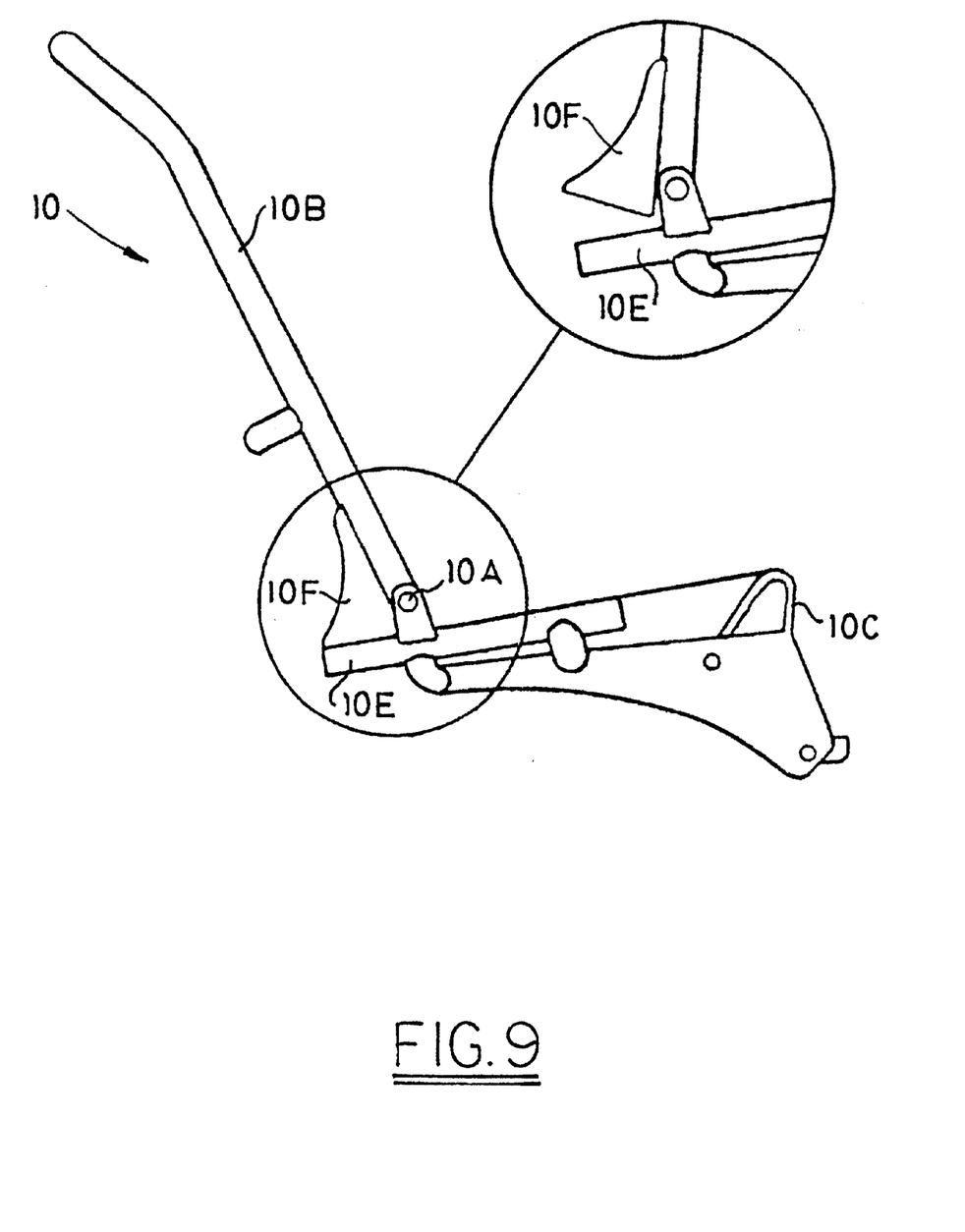
FIG. 9 provides a side view of an alternative preferred embodiment of a seat for our recumbent bicycle.

As previously noted, our seat 10 is foldable around seat pivots 10A. This allows seat back 10B to fold downward against seat base 10C as illustrated in FIG. 8. The ability of our seat 10 to be collapsed in this manner is important for storage purposes. However, it is also of particular importance when the recumbent bicycle is being transported via automobile roof-top mounting. When such mounting is used, the long axis of the bicycle is typically aligned with the long axis of the vehicle. In this position, an open seat back would create an obstruction that would raise air resistance and possibly tend to catch on low hanging branches or other obstacles. Our foldable seat 10 helps to avoid these problems. When upright, seat back 10B may be supported in numerous ways. In the preferred embodiment, seat back 10B is supported by cables 10D attached to seat base 10C. (Chains, webbing, or some equivalent means attached between seat back 10B and seat base 10 could also be used for this same purpose.) In the alternative preferred embodiment illustrated in FIG. 9, two new sets of members interact to achieve this result: seat base extensions 10E and seat back braces 10F.

Finally, the seat back 10B of our design is provided with biasing means that serve to bias it towards either a fully opened position or a closed (folded) position. Thus, when opened fully (as illustrated in FIG. 8), our seat back 10B will tend to remain open unless the user exerts moderate force to bring it back across center line 12. Likewise, it will tend to remain closed unless the user exerts moderate force to raise it up past center line 12. The former quality is desirable while the recumbent bicycle is in use, while the latter quality becomes important when it is transported, particularly on an automobile roof top mount. In this situation, we have found that the biasing means provided serves to maintain seat 10 in a closed position even when facing into the onrush of air caused by the forward motion of the vehicle on which it is mounted. The tangible elements forming this biasing means are part of the basic structure of chair 10. The somewhat elastic materials making up the cover (denoted generally by arrow 10E) of chair 10 are anchored at the rear by straps 10F to lower tube member 10G. As the back 10B is moved forward from its fully opened position, this material is stretched. It reaches its maximum extension when seat back 10B is close to vertical and straps 10F are aligned with seat pivots 10A. The material moves into a less stretched configuration as it approaches a horizontal position. Thus, force must be exerted both to raise the seat up past the vertical center line 12 from a horizontal position and from its fully opened position.

Figure 10:
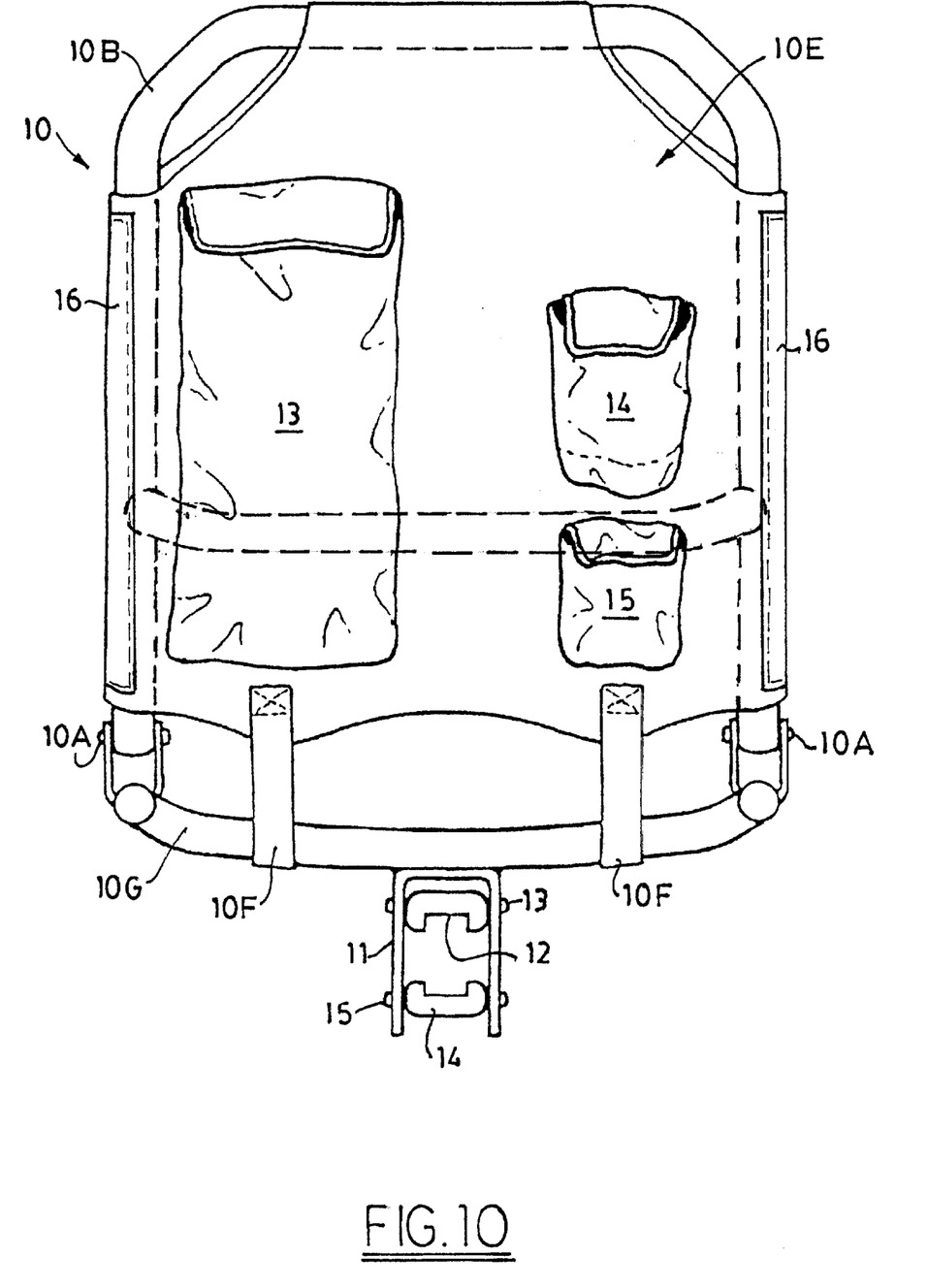
FIG. 10 provides a back view of the preferred embodiment of a seat for our recumbent bicycle, further incorporating reflectors and utility pockets.

The seat 10 of our recumbent bicycle is also provided with additional convenient features for the use of the rider as shown in FIG. 10. These include integral pockets for several purposes. Thus, there is a hydration pack pocket 13 and a water bottle pocket 14 of appropriate dimension for these purposes as well as a utility pocket 15 of general usefulness. Finally, reflective strips 16 are provided for the safety of the rider. Numerous other changes and additions can be made without exceeding the scope of the inventive concept as set forth herein.

We claim:

1. A recumbent bicycle having two sides and a split frame with a forward portion and a rear portion joined by a pivot, comprising:
   a. a mid-drive sprocket coaxial with the pivot;
   b. pivot supporting arms of said forward portion disposed on each side of said recumbent bicycle with said pivot and said mid-drive sprocket supported thereby and disposed there between; and
   c. a slideable cantilevered bicycle seat mounted to said forward portion, said bicycle seat being rearward of and supported by a lower contact member and an upper contact member arranged to interact with the forward portion, the lower contact member being positioned forward of the upper contact member.

2. A recumbent bicycle as set forth in claim 1, wherein said supporting arms are arranged so as to allow said rear portion to rotate around said pivot to a position between said supporting arms and adjacent said forward portion.

3. A recumbent bicycle as set forth in claim 1, further including a shock absorber connected between said forward portion and said rear portion and arranged to damp movement around said pivot.

4. A recumbent bicycle as set forth in claim 1, wherein said bicycle seat is prevented from sliding with respect to said forward portion solely by frictional binding forces.

5. A recumbent bicycle as set forth in claim 1, wherein said cantilevered bicycle seat can be repositioned by moving said seat upward with respect to said forward portion, sliding said seat to a new position, and moving said seat downward with respect to said forward portion.

6. A recumbent bicycle as set forth in claim 4, wherein said lower contact member and said upper contact member interact with, respectively, a rigid lower rail and a rigid upper rail attached to said forward portion, and said members and rails are formed so as to wedge together when brought into snug abutting contact so as to increase the frictional binding forces between said members and said rails.

7. A recumbent bicycle as set forth in claim 6, wherein said members are formed from resilient semi-deformable materials that are semi-deformed by being brought into snug contact with their respective rails so as to better grip said rails and to increase the frictional binding forces between said members and said rails.

8. A recumbent bicycle as set forth in claim 1, wherein said bicycle seat has a lower seat portion and a back rest portion and said back rest portion can be situated in a first configuration where it is approximately perpendicular to said seat portion and can be situated in a second configuration where it is folded downward so that it is approximately parallel to said lower seat portion.

9. A recumbent bicycle as set forth in claim 8, wherein the materials forming said bicycle seat are chosen and arranged so as to cause the seat to be biased toward said first configuration when proximate said configuration and toward said second configuration when proximate said configuration.

10. A recumbent bicycle, comprising:
    a. a forward portion and a rear portion joined by a pivot;

b. a mid-drive sprocket coaxial with said pivot; and c. a slideable cantilevered bicycle seat mounted to said forward portion, said bicycle seat being rearward of and supported by a lower contact member and an upper contact member arranged to interact with the forward portion, the lower contact member being positioned forward of the upper contact member.

11. A recumbent bicycle as set forth in claim 10, further including a shock absorber connected between said forward portion and said rear portion and arranged to damp movement around said pivot.

12. A recumbent bicycle as set forth in claim 10, wherein said bicycle seat is prevented from sliding with respect to said forward portion solely by frictional binding forces.

13. A recumbent bicycle as set forth in claim 10, wherein said cantilevered bicycle seat can be repositioned by moving said seat upward with respect to said forward portion, sliding said seat to a new position, and moving said seat downward with respect to said forward portion.

14. A recumbent bicycle as set forth in claim 12, wherein said lower contact member and said upper contact member interact with, respectively, a rigid lower rail and a rigid upper rail attached to said forward portion, and said members and rails are formed so as to wedge together when brought into snug abutting contact so as to increase the frictional binding forces between said members and said rails.

15. A recumbent bicycle as set forth in claim 14, wherein said members are formed from resilient semi-deformable materials that are semi-deformed by being brought into snug contact with their respective rails so as to better grip said rails and to increase the frictional binding forces between said members and said rails.

16. A recumbent bicycle as set forth in claim 10, wherein said bicycle seat has a lower seat portion and a back rest portion and said back rest portion can be situated in a first configuration where it is approximately perpendicular to said seat portion and can be situated in a second configuration where it is folded downward so that it is approximately parallel to said lower seat portion.

17. A recumbent bicycle as set forth in claim 16, wherein the materials forming said bicycle seat are chosen and arranged so as to cause the seat to be biased toward said first configuration when proximate said configuration and toward said second configuration when proximate said configuration.

18. A recumbent bicycle having two sides and a split frame with a forward portion and a rear portion joined by a pivot, comprising:

a. a mid-drive sprocket coaxial with the pivot; and b. pivot supporting arms of said forward portion disposed on each side of said recumbent bicycle with said pivot and said mid-drive sprocket supported thereby and disposed there between.

19. A recumbent bicycle as set forth in claim 18, wherein said supporting arms are arranged so as to allow said rear portion to rotate around said pivot to a position between said supporting arms and adjacent said forward portion.

20. A recumbent bicycle as set forth in claim 18, further comprising a slideable cantilevered bicycle seat mounted to said forward portion, said bicycle seat being rearward of and supported by a lower contact member and an upper contact member arranged to interact with the forward portion, the lower contact member being positioned forward of the upper contact member.

21. A recumbent bicycle as set forth in claim 18, further including a shock absorber connected between said forward portion and said rear portion and arranged to damp movement around said pivot.

22. A recumbent bicycle as set forth in claim 20, wherein said bicycle seat is prevented from sliding with respect to said forward portion solely by frictional binding forces.

23. A recumbent bicycle as set forth in claim 20, wherein said cantilevered bicycle seat can be repositioned by moving said seat upward with respect to said forward portion, sliding said seat to a new position, and moving said seat downward with respect to said forward portion.

24. A recumbent bicycle as set forth in claim 22, wherein said lower contact member and said upper contact member interact with, respectively, a rigid lower rail and a rigid upper rail attached to said forward portion, and tapering of said members and rails causes them to wedge together when brought into snug abutting contact so as to increase the frictional binding forces between said members and said rails.

25. A recumbent bicycle as set forth in claim 24, wherein said members are formed from resilient semi-deformable materials that are semi-deformed by being brought into snug contact with their respective rails so as to better grip said rails and to increase the frictional binding forces between said members and said rails.

26. A recumbent bicycle as set forth in claim 18, wherein said bicycle seat has a lower seat portion and a back rest portion and said back rest portion can be situated in a first configuration where it is approximately perpendicular to said seat portion and can be situated in a second configuration where it is folded downward so that it is approximately parallel to said lower seat portion.

27. A recumbent bicycle as set forth in claim 26, wherein the materials forming said bicycle seat are chosen and arranged so as to cause the seat to be biased toward said first configuration when proximate said configuration and toward said second configuration when proximate said configuration.

* * * * *